(12) United States Patent
Srinivasan et al.

(10) Patent No.: US 10,320,838 B2
(45) Date of Patent: Jun. 11, 2019

(54) TECHNOLOGIES FOR PREVENTING MAN-IN-THE-MIDDLE ATTACKS IN SOFTWARE DEFINED NETWORKS

(71) Applicant: Cisco Technology, Inc., San Jose, CA (US)

(72) Inventors: Venkatesh Srinivasan, San Jose, CA (US); Ambrish Niranjan Mehta, San Jose, CA (US); Anand Kumar Singh, San Jose, CA (US); Anulekha Chodey, San Jose, CA (US); Natarajan Manthiramoorthy, San Jose, CA (US); Swaminathan Narayanan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 221 days.

(21) Appl. No.: 15/215,290

(22) Filed: Jul. 20, 2016

(65) Prior Publication Data

US 2018/0027012 A1    Jan. 25, 2018

(51) Int. Cl.
| | |
|---|---|
| H04L 29/06 | (2006.01) |
| H04L 29/12 | (2006.01) |
| H04L 12/931 | (2013.01) |
| H04L 12/46 | (2006.01) |

(52) U.S. Cl.
CPC ...... *H04L 63/1466* (2013.01); *H04L 12/4641* (2013.01); *H04L 49/70* (2013.01); *H04L 61/103* (2013.01); *H04L 61/2015* (2013.01); *H04L 63/101* (2013.01); *H04L 63/1416* (2013.01); *H04L 63/1483* (2013.01); *H04L 61/6022* (2013.01); *H04L 2463/145* (2013.01)

(58) Field of Classification Search
None
See application file for complete search history.

(56) References Cited

U.S. PATENT DOCUMENTS

| | | | |
|---|---|---|---|
| 7,464,183 B1 | 12/2008 | Ioffe et al. | |
| 7,471,684 B2 | 12/2008 | Finley, Jr. et al. | |
| 8,302,190 B2 | 10/2012 | Li | |
| 9,083,716 B1 | 7/2015 | Cho | |
| 9,755,965 B1* | 9/2017 | Yadav | H04L 45/54 |
| 9,787,691 B2* | 10/2017 | Samuel Raj | H04L 63/108 |
| 2006/0088037 A1* | 4/2006 | Finley, Jr. | H04L 29/12009 370/395.54 |
| 2013/0322443 A1* | 12/2013 | Dunbar | H04L 12/185 370/390 |
| 2015/0055651 A1* | 2/2015 | Shen | H04L 12/1854 370/390 |

(Continued)

*Primary Examiner* — Farid Homayounmehr
*Assistant Examiner* — Olanrewaju J. Bucknor
(74) *Attorney, Agent, or Firm* — Polsinelli PC

(57) ABSTRACT

Systems, methods, and computer-readable media for preventing man-in-the-middle attacks within network, without the need to maintain trusted/un-trusted port listings on each network device. The solutions disclosed herein leverage a host database which can be present on controllers, thereby providing a centralized database instead of a per-node DHCP binding database. Systems configured according to this disclosure (1) use a flood list only for ARP packets received from the controller 116; and (2) unicast ARP packets to the controller before communicating the packets to other VTEPs.

17 Claims, 6 Drawing Sheets

(56) References Cited

U.S. PATENT DOCUMENTS

| | | | |
|---|---|---|---|
| 2015/0117451 A1* | 4/2015 | Kaneriya | H04L 45/745 |
| | | | 370/392 |
| 2015/0124822 A1* | 5/2015 | Chu | H04L 45/22 |
| | | | 370/392 |
| 2015/0169351 A1* | 6/2015 | Song | H04L 12/4641 |
| | | | 718/1 |
| 2015/0358345 A1 | 12/2015 | Clark et al. | |
| 2015/0373688 A1* | 12/2015 | Samuel Raj | H04L 63/108 |
| | | | 370/329 |
| 2016/0294769 A1* | 10/2016 | Song | H04L 12/4641 |

\* cited by examiner

TECHNOLOGIES FOR PREVENTING MAN-IN-THE-MIDDLE ATTACKS IN SOFTWARE DEFINED NETWORKS

TECHNICAL FIELD

The present technology pertains to network security, and more specifically to preventing man-in-the-middle attacks on software defined networks.

BACKGROUND

A "Man-In-The-Middle" (MIM) attack on a Software Defined Network (SDN) can occur when a malicious impersonator inserts itself in the middle of a communication, acting as a relay or a proxy between the two hosts, thereby exploiting data in the communication without the communication parties being aware their communication has been intercepted. MIM attacks are often done by manipulating the ARP (Address Resolution Protocol) and/or Grat ARP (Gratuitous ARP) protocols by sending the attacker's MAC (Media Access Control) address with the victim's source IP address either in a Grat ARP packet or in a response to an ARP request, then poisoning the ARP cache of addresses on switches and hosts.

While data center networks have security around their network perimeter to protect their networks from out-of-network attacks, there is a growing concern about attacks launched from within a network by a disgruntled employee, where employees perform ARP spoofing, ARP cache poisoning of end hosts, or constructing data plane packets which emulate other hosts. Traditional prevention of such "inside" MIM attacks utilize solutions such as DAI (Dynamic ARP Inspection) and DHCP (Dynamic Host Configuration Protocol) snooping, such solutions utilize a Trusted Ports model which depends on DHCP servers residing behind trusted ports. Such solutions, however, cannot operate for overlay networks because all overlay communications happen over a NVE (Network Virtualization Endpoint), and therefore a traditional "Trust" model is not applicable for such deployments regardless of where a DHCP server is residing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to prevent MIM attacks within a SDN, without the need to maintain trusted/un-trusted port listings on each network device. The solutions disclosed herein leverage a host database which can be present on controllers, thereby providing a centralized database instead of a per-node DHCP binding database.

Disclosed are systems, methods, and computer-readable storage media for preventing In-Network MIM attacks. For example, a system configured as described herein can receive, at a Software Defined Network controller, a from a first host designated for a second host, where the Software Defined Network controller, the first host, and the second host are on a secured network, and where the packet is received via a switch. The packet can be, for example, a unicast Address Resolution Protocol (ADR) packet, a multicast ADR packet, or a broadcast packet. The controller can then verify the first host as valid by comparing the packet to a host database and, after verifying the first host is valid, send a reply of the packet to the switch, the reply providing instructions regarding communications from the first host. Such instructions can include an authorization for the first host to begin communicating with the second host (and/or other hosts) using unicast and/or flood list communications, or for the second host (and/or other hosts) to begin accepting communications from the first host. Alternatively, the reply can indicate the host is not valid, and therefore provide instructions to drop the packet and any subsequent packets received from the host.

Description

Figure 1A:
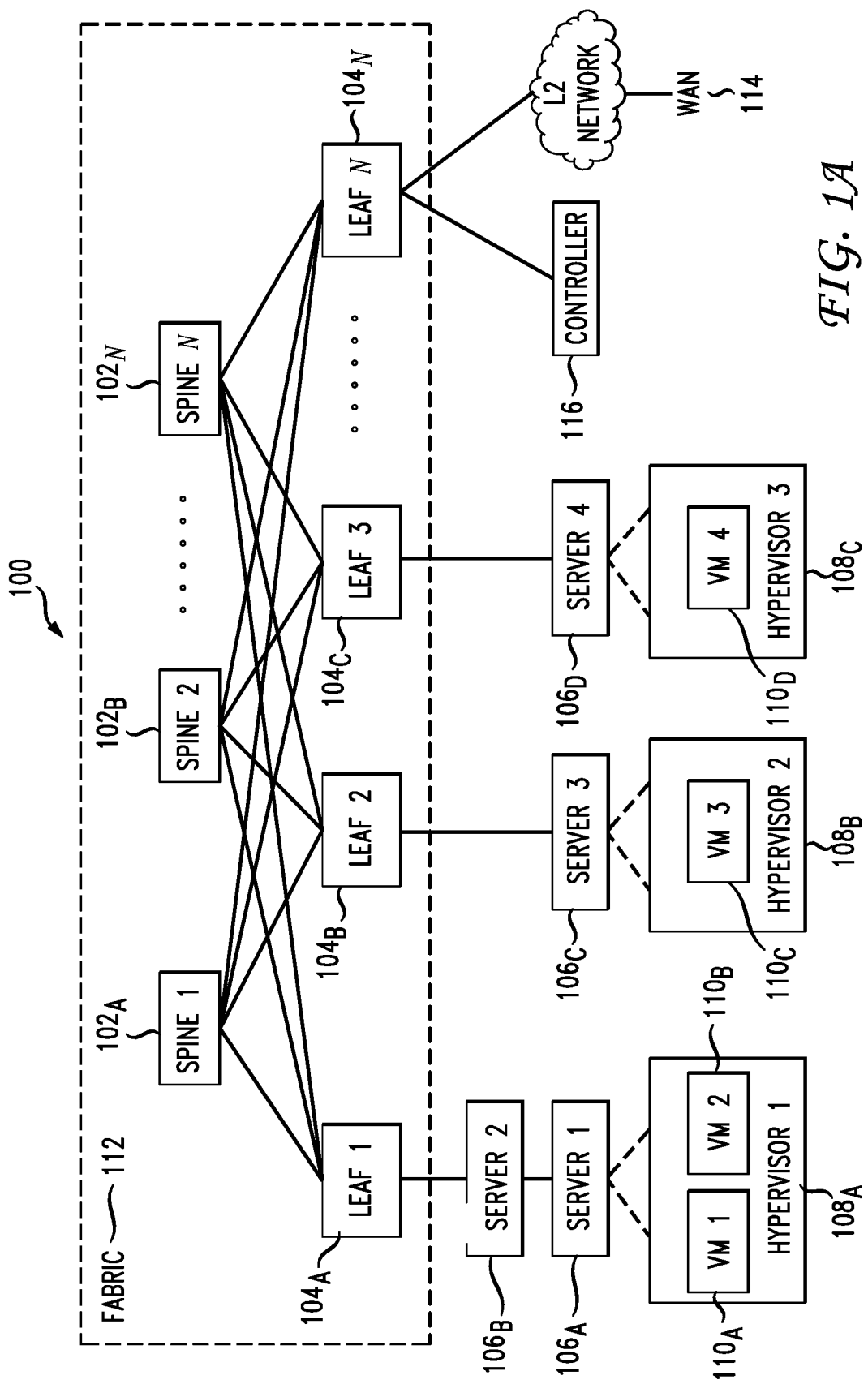
FIGS. 1A and 1B illustrate diagrams of an example network environment.
Figure 1B:
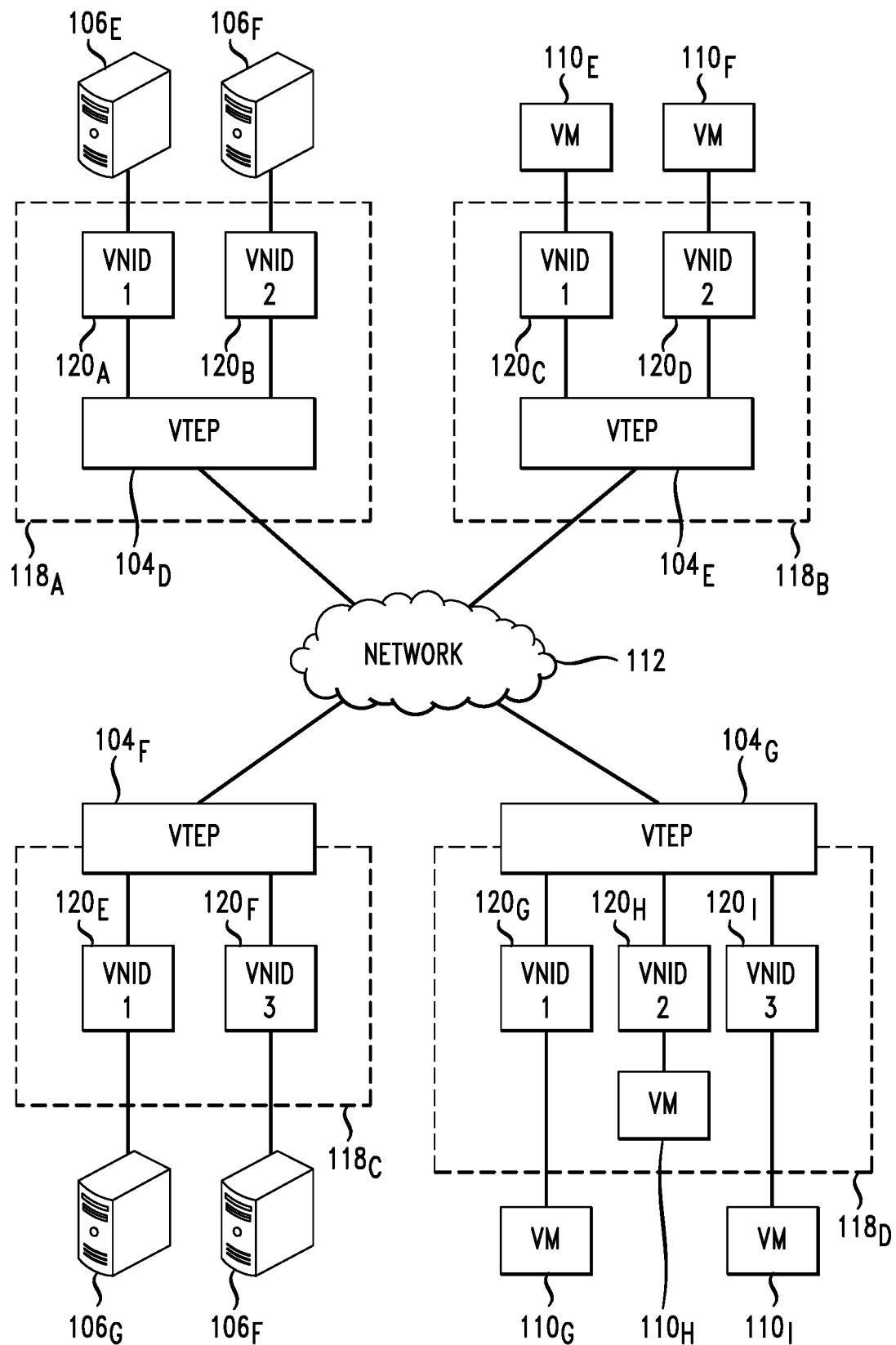

The disclosed technology addresses the need in the art for prevention of In-Network MIM attacks without DHCP being used in the network. A description of an example network environment, as illustrated in FIGS. 1A and 1B, is first disclosed herein. A discussion of preventing In-Network MIM attacks will then follow, accompanied by exemplary variations. These variations shall be described herein as the various embodiments are set forth. The disclosure now turns to FIG. 1A.

FIG. 1A illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-4 (106$_{A-D}$) (collectively "106"), hypervisors 1-3 (108$_A$-108$_C$) (collectively "108"), and virtual machines (VMs) 1-5 (110$_A$-110$_D$) (collectively "110") access to fabric 112. For example, leaf routers 104 can encapsulate and decapsulate packets to and from servers 106 in order to enable communications throughout environment 100. Leaf routers 104 can also connect other devices, such as WAN 114, with fabric 112. Leaf routers 104 can also provide any other servers, resources, endpoints, external networks, VMs, services, tenants, or workloads with access to fabric 112.

The leaf routers 104 can be responsible for routing and/or bridging the tenant packets and applying network policies. On the other hand, the spine routers 102 can perform the routing within the fabric 112. Thus, network connectivity in the fabric 112 can flow from the spine routers 102 through the leaf routers 104. The leaf routers 104 can provide servers 1-N (106$_{A-N}$) (collectively "106") and VMs 110 access to the fabric 112. In some cases, the leaf routers 104 can also provide any other servers, resources, endpoints, external networks, VMs, services, tenants, or workloads with access to the fabric 112.

The leaf routers 104 can include VTEP interfaces 1-N, and switching virtual interfaces (SVIs) 1-N. The VTEP interfaces can encapsulate and decapsulate packets to and from the overlay, such as overlay network 100, to the underlay (e.g., fabric 112) in order to connect devices in the overlay (e.g., servers 106 and VMs 110) through the underlay. The SVIs can provide virtual interfaces used by the leaf routers 104 to communicate with the overlay (e.g., servers 106 and VMs 110).

The leaf routers 104 can have assigned addresses for their VTEP interfaces. The addresses assigned to the VTEP interfaces can be underlay addresses, meaning, the addresses can be based on one or more subnets in the underlay (i.e., fabric 112). The underlay addresses allow the leaf routers 104 to communicate with other devices in the underlay through the VTEP interfaces. Moreover, the leaf routers 104 can have assigned virtual addresses for their SVIs. The virtual addresses assigned to the SVIs can be overlay addresses, meaning, the addresses can be based on one or more subnets in the overlay (e.g., servers 106 and VMs 110).

For example, VTEP 1 can be assigned underlay address 1.1.1.1, VTEP 2 can be assigned underlay address 1.1.1.2, VTEP 3 (216$_C$) can be assigned underlay address 1.1.1.3, and VTEP N can be assigned underlay address 1.1.1.4. On the other hand, SVI 1 can be assigned overlay address 10.1.1.254, SVI 2 can be assigned overlay address 20.1.1.254, SVI 3 can be assigned overlay address 10.1.1.254, and SVI N can be assigned overlay address 20.1.1.254. The SVIs can be assigned an anycast address as the overlay address, meaning, the SVIs can be assigned an address that is also assigned to one or more other SVIs. For example, SVIs 1 and 3 can both be assigned address 10.1.1.254, while SVIs 2 and N can both be assigned address 20.1.1.254.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server 106$_A$ and hypervisor 108$_A$ can host VMs 110$_{A-B}$.

A controller 116 is an application and/or a device that manages flow control to enable intelligent networking. The controller can also contain, or be in communication with, a host database listing addresses of all hosts (including Virtual Tunnel End Points (VTEPs) and/or VMs) within the network. As will be further discussed below, the controller will be used to verify that packets being sent within the network are valid, thereby preventing spoofing, cache poisoning, and other MIM tactics.

Communications between the overlay and the underlay in a network typically flow from a virtual interface on a device, such as a switching virtual interface (SVI), to a tunnel endpoint interface, such as a VXLAN tunnel endpoint (VXLAN) interface, on either the same or a different device. Virtual interfaces in an overlay network often have an assigned anycast address shared between multiple devices.

FIG. 1B illustrates a diagram of an example overlay network 100. Overlay network 100 uses an overlay protocol, such as VXLAN (virtual extensible LAN), NVGRE (Network Virtualization using Generic Routing Encapsulation), or STT (stateless transport tunneling), to encapsulate traffic in L2 and/or L3 packets which can cross overlay L3 boundaries in the network 112.

The overlay network 100 can include a network 112, which can represent the core, physical network and/or fabric. In some cases, network 112 can include an IP and/or MPLS network. Moreover, network 112 can be a service provider network. For example, network 112 can be an IP and/or MPLS service provider network.

Overlay network 100 can include devices 118A-D interconnected via network 112. Devices 118A-D can include virtual tunnel end points 104D-G, which can be physical or virtual nodes or switches configured to encapsulate and de-encapsulate data traffic according to a specific overlay protocol of the network 100, for the various virtual network identifiers (VNIDs) 120A-I. Devices 118A-D can include servers containing a VTEP functionality, hypervisors, and physical network devices, such as switches, configured with a virtual tunnel endpoint functionality. For example, devices in 118A and 118B can be physical switches, such as top-of-rack (ToR) switches, configured to run VTEPs 104D-E. Here, devices 118A and 118B can be connected to servers 106AE-F which, in some cases, can include virtual workloads through VMs loaded on the servers.

In some embodiments, network 100 can be a VXLAN network, and virtual tunnel end points 104D-G can be VXLAN tunnel end points (VTEPs). However, as one of ordinary skill in the art will readily recognize, overlay network 100 can represent any type of overlay or software-defined network, as previously mentioned.

The VNIDs can represent the segregated virtual networks in overlay network 100. Each of the overlay tunnels (VTEPs 104A-D) can be coupled with one or more VNIDs. For example, VTEP 104A can be coupled with virtual or physical devices or workloads residing in VNIDs 1 and 2; VTEP 104B can be coupled with virtual or physical workloads residing in VNIDs 1 and 3; VTEP 104C can be coupled with virtual or physical devices or workloads residing in VNIDs 1 and 2; and VTEP 104D can be coupled with virtual or physical devices or workloads residing in VNIDs 1, 2, and 3. As one of ordinary skill in the art will readily recognize, any particular VTEP can, in other embodiments, be coupled with more or less VNIDs than the VNIDs illustrated in FIG. 1B.

The traffic in overlay network 100 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints in specific VNIDs can communicate with other devices or endpoints in the same specific VNIDs, while traffic from separate VNIDs can be isolated to prevent devices or endpoints in other specific VNIDs from accessing traffic in different VNIDs.

Each of the servers 104 and VMs 110 in FIGS. 1A and 1B can be associated with a respective VNID or virtual segment, and communicate with other servers or VMs residing in the same VNID or virtual segment. For example, server 104E can communicate with server 104G and VM 110E because they all reside in the same VNID, viz., VNID 1. Similarly, server 104B can communicate with VMs 110F, and 110H because they all reside in VNID 2.

Each of the servers 104 and VMs 110 can represent a single server or VM, but can also represent multiple servers or VMs, such as a cluster of servers or VMs. Moreover, VMs 1010 can host virtual workloads, which can include application workloads, resources, and services, for example. On the other hand, servers 104 can host local workloads on a local storage and/or a remote storage, such as a remote database. However, in some cases, servers 104 can similarly host virtual workloads through VMs residing on the servers 104.

VTEPs 104 can encapsulate packets directed at the various VNIDs 1-3 in the overlay network 100 according to the specific overlay protocol implemented, such as VXLAN, so traffic can be properly transmitted to the correct VNID and recipient(s) (i.e., server or VM). Moreover, when a switch, router, VTEP, or any other network device receives a packet to be transmitted to a recipient in the overlay network 100, it can consult a routing table or virtual routing and forwarding (VRF) table, such as a lookup table, to determine where such packet needs to be transmitted so the traffic reaches the appropriate recipient. For example, if VTEP 104D receives a packet from an endpoint that is intended for VM 110E, VTEP 104D can consult a routing table that maps the intended VM, VM 110E, to a specific network device (e.g., VTEP 104E) that is configured to handle communications intended for endpoint that VM (e.g., VM 110E). VTEP 104D might not initially know, when it receives the packet from the endpoint, that such packet should be transmitted to VTEP 104E in order to reach VM 110E. Thus, by consulting the routing table, VTEP 104D can lookup VM 110E, which is the intended recipient, and determine that the packet should be transmitted to VTEP 104E as specified in the routing table based on endpoint-to-switch mappings or bindings, so the packet can be transmitted to, and received by, VM 110E as expected. It is noted that endpoints, as used herein, can include both VTEPs as well as endhosts (i.e., non-virtual endpoints such as servers and hypervisors).

As one of ordinary skill in the art will readily recognize, the examples provided above are non-limiting examples provided for explanation purposes, and can include other variations of protocols, topologies, or devices.

Figure 2:
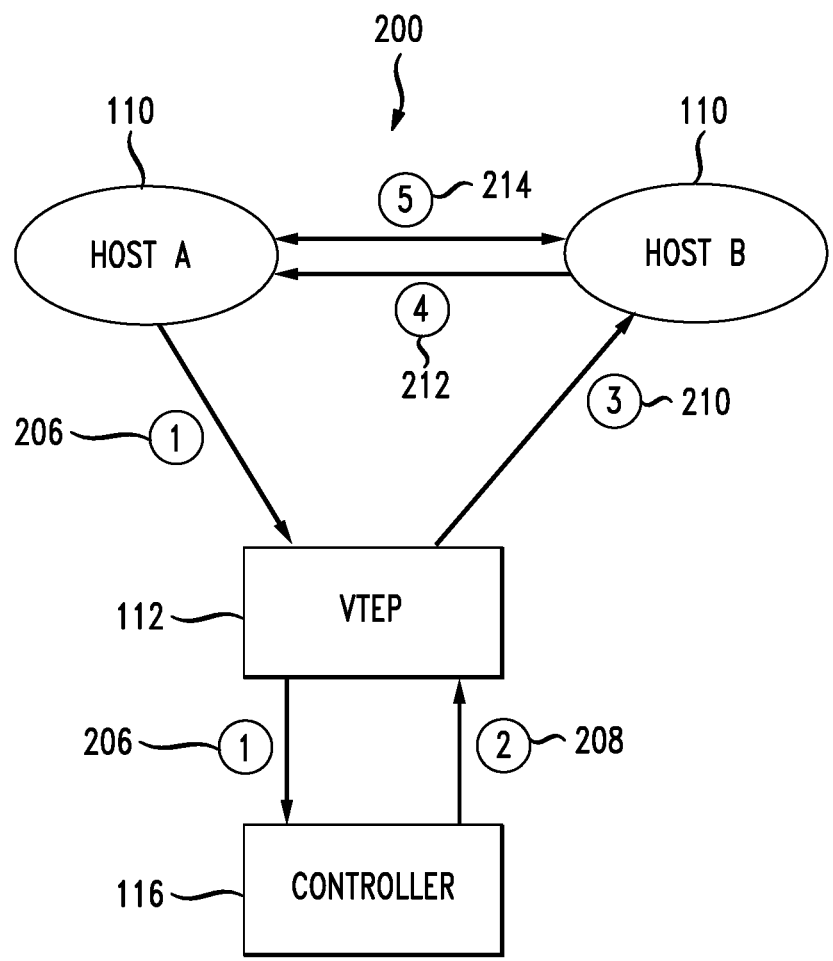
FIG. 2 illustrates an example of host verification as disclosed herein.

Having disclosed some basic system components and concepts, the disclosure now turns to the example of host verification 200 shown in FIG. 2. For the sake of clarity, Host A 110 and Host B 110 can be any combination of servers, hypervisors, VMs, or other network components illustrated outside the Fabric 112 of FIG. 1. With most orchestration tools, every host/VM in the network is created using APIs such as "Create Server," and the information related to the VM includes the IP address, MAC address, and the VTEP behind which the VM resides. The VNI (Virtual Network Identification) of the host are available to a controller 116 which maintains a host database tracking this information. Also included at during host creation is the adjacency information of the host, which records the port behind which the host resides on a VTEP.

As illustrated, Host A 110 wants to do an ARP request to Host B 110. Typically, this could be done by Host A 110 flooding the packet to other VTEPs having the VNI (using a Multicast tree or Ingress Replication) using a Network Switch 102 acting as a VTEP. In FIG. 2, this VTEP emulation is noted using 112, the fabric, thereby indicating that more than one single switch can be used. However, such "typical" actions leave the network vulnerable to internal MIM attacks.

Systems configured according to this disclosure modify the typical behavior by not allowing the ARP packet to be flooded to the end hosts 110 until it is validated by the controller 116. Thus, Host A 110 first communicates 206 the ARP packet (as a Unicast packet) to the controller 116 for verification that Host A 110 is a genuine source. The switch, acting as a VTEP 112, "traps" the packet while the controller makes a decision. If the controller 116 determines that the packet is invalid, the controller instructs 208 the switch 112 to drop the packet and any future packets from Host A 110. However, if the controller 116 validates the packet as from a valid source, the controller 116 sends a Unicast reply 208 of the same ARP packet to the switch 112, which the switch 112 in turn forwards 210 to Host B 110 (or can forward the packet per original instructions). Upon receiving the packet 210 from the controller 116, Host B 110 can then initiate communications with Host A 110, either by (1) a Unicast communication 212 or (2) by sending a request through the VTEP. In this second example, the system can also be configured such that when the switch 112 receives the validation message 208 from the controller 116, the switch 112 can use the flood list to immediately send out the ARP request to other VTEPs, without first sending and re-receiving the communications to/from Host B 110.

Essentially, the VTEPs 110: (1) use a flood list or unicast communication only for ARP packets received and positively validated from the controller 116; and (2) unicast ARP packets to the controller before communicating the packets to other VTEPs. This same behavior is done for a Grat ARP as well. When the controller has validated the host, the packet can then be sent to the destination MAC in the ARP.

Such a configuration could, in the event of a VM move, require the moving VM to send/receive ARP packets from the remaining hosts, which in turn requires the controller 116 to verify each respective packet. To avoid this delay, the controller 116 upon being informed of the host move, can initiate a Grat ARP on behalf of the host that is moving. With the controller 116 initiating the Grat ARP, the flood list on the controller can be used to contact the other hosts within the VNI.

The scenarios mentioned above handle In-Network MIM attacks based on ARP spoofing. In some circumstances, an attacker can directly send data packets on behalf of a different host by constructing a data packet with the source IP and MAC addresses of a different host (i.e., pretending to be a different host). To prevent such action, on the first hop switch for every new MAC learn action, or MAC move action, a packet/notification is sent to the controller 116 with the VTEP and port associated with the MAC. The controller 116 then uses the same host database validation process described above to confirm the source is indeed the owner of the address. If the packet is verified, communications from the new/different host can continue. If, however, the packet is identified as coming from a fraudulent source, the system (and specifically, the controller 116) can dynamically provision an ACL (Access Control List) to drop subsequent packets from the fraudulent source at the ingress on the first hop VTEP.

Figure 3:
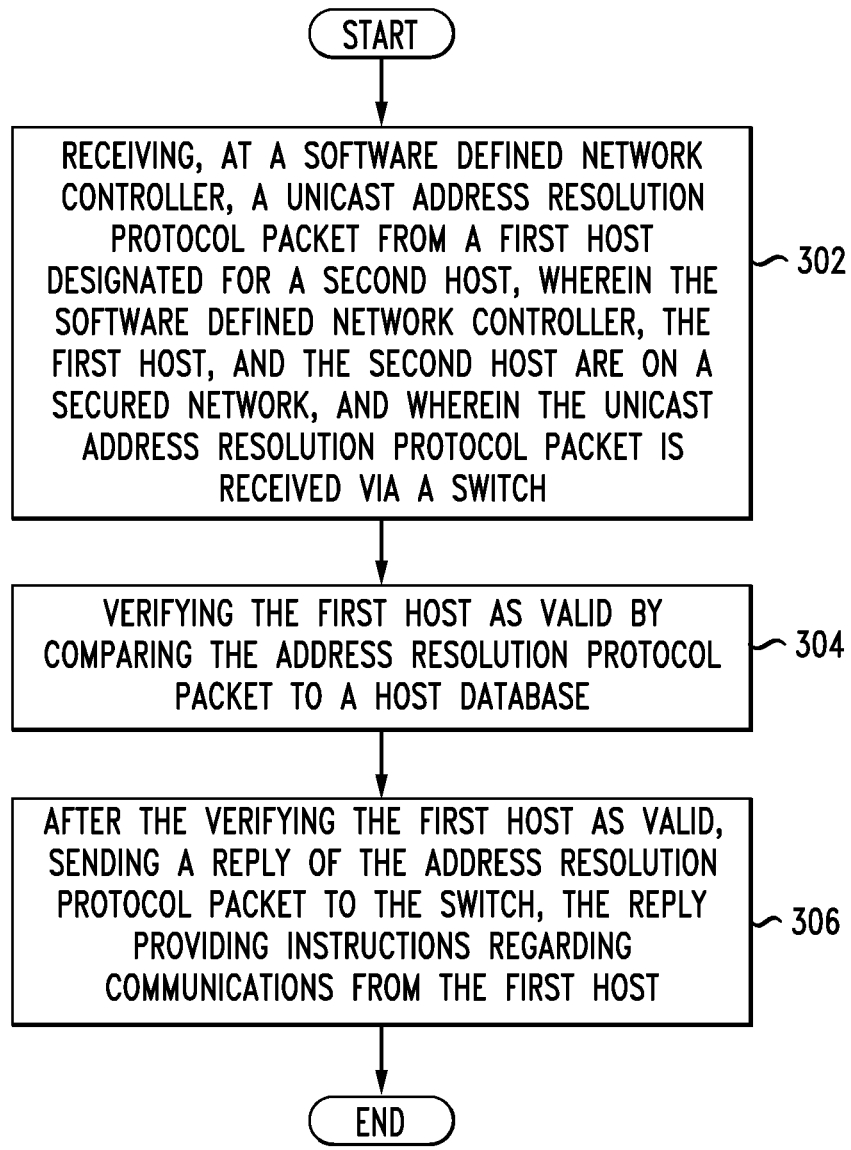
FIG. 3 illustrates an exemplary method embodiment

FIG. 3 illustrates an example method embodiment. For the sake of clarity, the method is described in terms of an exemplary controller 116 as shown in FIG. 1 configured to practice the method. The steps outlined herein are exemplary and can be implemented in any combination thereof, including combinations that exclude, add, or modify certain steps.

The system 116 receives, at a Software Defined Network (SDN) controller, a unicast Address Resolution Protocol (ARP) packet from a first host designated for a second host, wherein the Software Defined Network controller, the first host, and the second host are on a secured network, e.g., behind a firewall, and wherein the unicast address resolution protocol packet is received via a switch (302). A "secured network" can mean that the SDN controller, the first host, and the second host are all within a self-contained Local Area Network (LAN), or can mean that the components are connected using a Wide Area Network (WAN) using firewalls and other security measures. The first and second hosts can be, for example, Virtual Tunnel End Points (VTEPs), Virtual Machines (VMs), Servers, and/or Hypervisors. In some cases, the unicast Address Resolution Protocol packet can be gratuitous, such that the first host is the same as the second host. In other configurations, the packet is not a unicast ARP packet, but may be a multicast packet or a broadcast packet.

The system 116 verifies the first host as valid by comparing the ARP packet to a host database (304). In some configurations, the host database is contained within the SDN controller, whereas in other configurations the host database is separate from the SDN controller and the SDN controller communicates with the host database to verify the first host as valid. Verification can include comparing an IP address, MAC address, or other identifying data to a list containing information about verified, allowable hosts.

After verifying the first host as valid, the system 116 sends a reply of the Address Resolution Protocol packet to the switch (such as a VTEP), the reply providing instructions regarding communications from the first host (306). For example, the reply may indicate that the first host is not valid, causing the switch to drop the Address Resolution Protocol packet and any subsequent packets received from the first host. Alternatively, the reply can indicate that the first host is authorized to send the Address Resolution Protocol to the second host (306). The sending of the reply can further authorize the first host to send the Address Resolution Protocol packet to a plurality of Virtual Tunnel End Points using a flood list via the switch, or a unicast communication to the second host.

In some configurations, the system 116 can determine that the first host is moving and initiate a gratuitous Address Resolution Protocol request on behalf of the first host. The system 116 can then send the gratuitous Address Resolution Protocol request to the first host, such that the first host is authorized to send the gratuitous Address Resolution Protocol request to a plurality of Virtual Tunnel End Points via the switch using a flood list.

Figure 4:
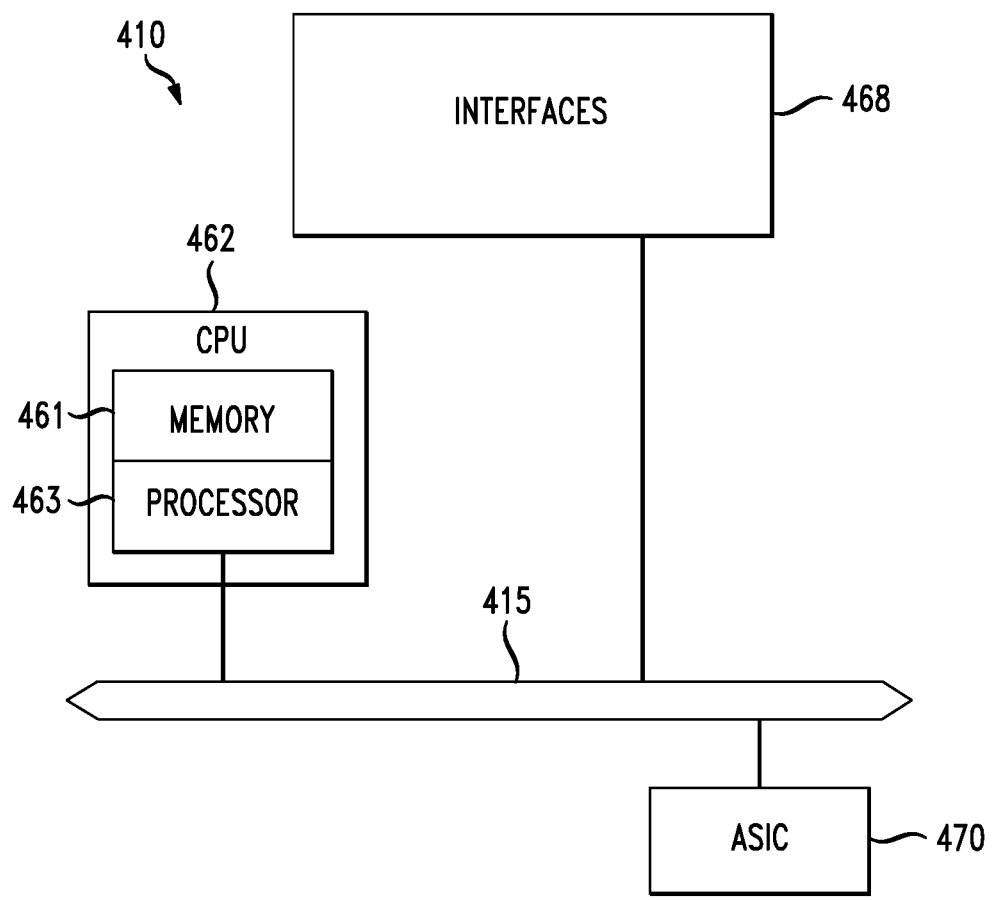
FIG. 4 illustrates an example network device.

FIG. 4 illustrates an example network device 410 (such as spine devices 102) suitable for high availability and failover. Network device 410 includes a master central processing unit (CPU) 462, interfaces 468, an ASIC (Application Specific Integrated Circuit) 470, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
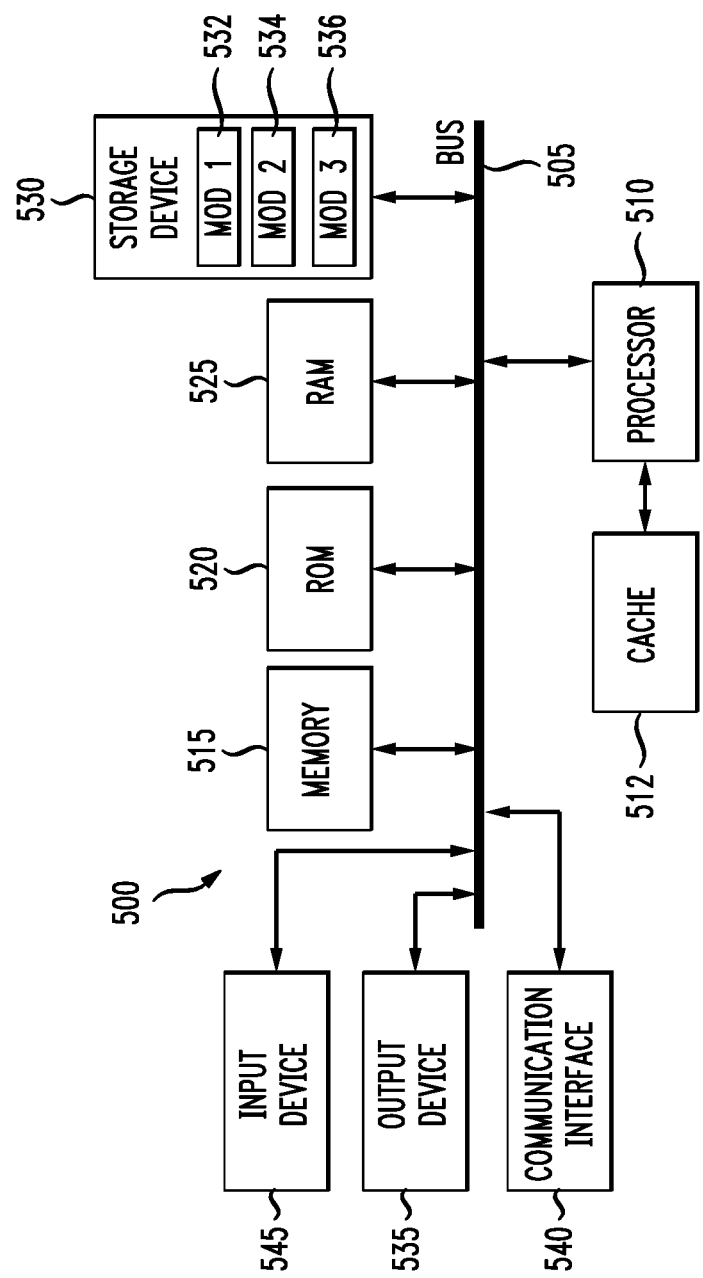
FIG. 5 illustrates an example system embodiment.

FIG. 5 illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
receiving, at a Software Defined Network (SDN) controller, a unicast Address Resolution Protocol packet from a first host designated for a second host, wherein the Software Defined Network controller, the first host, and the second host are on a secured network, and wherein the unicast Address Resolution Protocol packet is received via a switch;
verifying, by the SDN controller, the first host as valid by comparing the unicast Address Resolution Protocol packet to a host database;
in response to verifying the first host as valid, sending a reply of the unicast Address Resolution Protocol packet to the switch, the reply providing instructions for the second host regarding communications with the first host and forwarding the unicast Address Resolution Protocol packet to the second host;
determining that the first host is moving;
initiating a gratuitous Address Resolution Protocol request on behalf of the first host; and
sending the gratuitous Address Resolution Protocol request to the SDN controller, such that the first host is authorized to send the gratuitous Address Resolution Protocol request to a plurality of Virtual Tunnel End Points via the switch using a flood list.

2. The method of claim 1, wherein the reply allows the switch to use a flood list to communicate the Address Resolution Protocol packet to the second host.

3. The method of claim 1, wherein the sending of the reply further authorizes the first host to send the Address Resolution Protocol packet to a plurality of Virtual Tunnel End Points via the switch using a flood list.

4. The method of claim 1, wherein the reply allows the first host to unicast the Address Resolution Protocol packet to the second host.

5. The method of claim 1, wherein when the Address Resolution Protocol packet is identified as fraudulent, the reply modifies an Access Control List on the switch such that subsequent packets received from the first host are dropped at the switch.

6. The method of claim 1, wherein no host is authorized to send an Address Resolution Protocol packet until authorized by the Software Defined Network controller.

7. A system comprising:
a processor; and
a non-transitory computer-readable storage medium having instructions stored which, when executed by the processor, cause the processor to perform operations comprising:
receiving, at a Software Defined Network controller, a unicast Address Resolution Protocol packet from a first host designated for a second host, wherein the Software Defined Network controller, the first host, and the second host are on a secured network, and wherein the unicast Address Resolution Protocol packet is received via a switch;
verifying, by the SDN controller, the first host as valid by comparing the unicast Address Resolution Protocol packet to a host database;
in response to verifying the first host as valid, sending a reply of the unicast Address Resolution Protocol packet to the switch, the reply providing instructions for the second host regarding communications with the first host and forwarding the unicast Address Resolution Protocol packet to the second host;
determining that the first host is moving;
initiating a gratuitous Address Resolution Protocol request on behalf of the first host; and
sending the gratuitous Address Resolution Protocol request to the Software Defined Network Controller, such that the first host is authorized to send the gratuitous Address Resolution Protocol request to a plurality of Virtual Tunnel End Points via the switch using a flood list.

8. The system of claim 7, wherein the reply allows the switch to use a flood list to communicate the Address Resolution Protocol packet to the second host.

9. The system of claim 7, wherein the sending of the reply further authorizes the first host to send the Address Resolution Protocol packet to a plurality of Virtual Tunnel End Points via the switch using a flood list.

10. The system of claim 7, wherein the reply allows the first host to unicast the Address Resolution Protocol packet to the second host.

11. The system of claim 7, wherein when the Address Resolution Protocol packet is identified as fraudulent, the reply modifies an Access Control List on the switch such that subsequent packets received from the first host are dropped at the switch.

12. The system of claim 7, wherein no host is authorized to send an Address Resolution Protocol packet until authorized by the Software Defined Network controller.

13. A computer-readable storage device having instructions stored which, when executed by a computing device, cause the computing device to perform operations comprising:
receiving, at a Software Defined Network controller, a unicast Address Resolution Protocol packet from a first host designated for a second host, wherein the Software Defined Network controller, the first host, and the second host are on a secured network, and wherein the unicast Address Resolution Protocol packet is received via a switch;
verifying, by the SDN controller, the first host as valid by comparing the unicast Address Resolution Protocol packet to a host database;
in response to verifying the first host as valid, sending a reply of the unicast Address Resolution Protocol packet to the switch, the reply providing instructions for the second host regarding communications with the first host and forwarding the unicast Address Resolution Protocol packet to the second host;
determining that the first host is moving;
initiating a gratuitous Address Resolution Protocol request on behalf of the first host; and
sending the gratuitous Address Resolution Protocol request to the SDN controller, such that the first host is authorized to send the gratuitous Address Resolution Protocol request to a plurality of Virtual Tunnel End Points via the switch using a flood list.

14. The computer-readable storage device of claim 13, wherein the reply allows the switch to use a flood list to communicate the Address Resolution Protocol packet to the second host.

15. The computer-readable storage device of claim 13, wherein the sending of the reply further authorizes the first host to send the Address Resolution Protocol packet to a plurality of Virtual Tunnel End Points via the switch using a flood list.

16. The computer-readable storage device of claim 13, wherein the reply allows the first host to unicast the Address Resolution Protocol packet to the second host.

17. The computer-readable storage device of claim 13, wherein when the Address Resolution Protocol packet is identified as fraudulent, the reply modifies an Access Control List on the switch such that subsequent packets received from the first host are dropped at the switch.

* * * * *